(12) United States Patent
Yaghi et al.

(10) Patent No.: US 12,000,122 B2
(45) Date of Patent: Jun. 4, 2024

(54) ATMOSPHERIC WATER HARVESTING SYSTEM WITH CROSS-FLOW CONFIGURATION

(71) Applicant: The Regents of the University of California, Oakland, CA (US)

(72) Inventors: Omar M. Yaghi, Berkeley, CA (US); Mathieu S. Prevot, Berkeley, CA (US); Nikita Hanikel, Berkeley, CA (US); Eugene A. Kapustin, Berkeley, CA (US); Farhad Fathieh, Berkeley, CA (US)

(73) Assignee: The Regents of the University of California, Oakland, CA (US)

(*) Notice: Subject to any disclaimer, the term of this patent is extended or adjusted under 35 U.S.C. 154(b) by 360 days.

(21) Appl. No.: 17/673,780

(22) Filed: Feb. 16, 2022

(65) Prior Publication Data

US 2022/0170247 A1    Jun. 2, 2022

Related U.S. Application Data

(63) Continuation of application No. PCT/US2020/044373, filed on Jul. 31, 2020.

(60) Provisional application No. 62/888,368, filed on Aug. 16, 2019.

(51) Int. Cl.
  *E03B 3/28*    (2006.01)
  *B01D 53/04*   (2006.01)
  *B01D 53/26*   (2006.01)
  *B01D 53/28*   (2006.01)

(52) U.S. Cl.
  CPC .......... *E03B 3/28* (2013.01); *B01D 53/0438* (2013.01); *B01D 53/261* (2013.01); *B01D 53/28* (2013.01); *B01D 2253/204* (2013.01)

(58) Field of Classification Search
  CPC ........ B01D 53/04; B01D 53/26; B01D 53/28; E03B 3/28
  See application file for complete search history.

(56) References Cited

U.S. PATENT DOCUMENTS

2018/0171604 A1*  6/2018  Kim .................... B01J 20/3204

* cited by examiner

*Primary Examiner* — Sharon Pregler
(74) *Attorney, Agent, or Firm* — Richard Aron Osman (57) ABSTRACT

Atmospheric water harvesting systems utilize a sorbent cartridge configured to hold water capture material. The sorbent cartridge is made up of a plurality of permeable trays and a plurality of spacers that are arranged to provide cross-flow for adsorption and desorption airflow pathways. The systems are used for harvesting water from surrounding air.

20 Claims, 9 Drawing Sheets

ATMOSPHERIC WATER HARVESTING SYSTEM WITH CROSS-FLOW CONFIGURATION

INTRODUCTION

Access to water is crucial for improving health, standards of living, and productivity worldwide.[1-2] However, it is expected that by the year 2050, fifty percent of the world population will experience water stress due to contamination of surface water and depletion of underground reservoirs.[2-6] In this context, techniques to produce clean water from alternative sources are desirable, especially in arid regions, where it is most needed.[6-7] Water harvesting from air has the potential to provide waste-free, safe water, and can be implemented off-grid at any location, due to the ubiquitous presence of vapor in the atmosphere. While direct extraction is easily achieved in humid climates by fog harvesting or through condensation by cooling air below its dew point, it is unfeasible and energy-intensive in arid environments.[8,9] One way to circumvent this limitation is to engineer an adsorbent-assisted water harvesting cycle (WHC), where water vapor from an arid air feed is first concentrated in a sorbent and subsequently released to a condenser. In essence, this increases the dew point of the now humidified air, and therefore, lowers the energy needed for condensation. This principle has been applied by using metal-organic frameworks (MOFs) as sorbents in water harvesting units.[10-12] These devices performed only one WHC per day (adsorption at night and desorption during the daytime), and therefore delivered negligible amounts of water.

In order to realize the vast potential of water harvesting from desert air, what is needed in the art is a system capable of multiple cycles per day. Fast kinetics of water uptake and release in a material becomes of paramount importance to give significantly larger amounts of water. However, work in this field has largely been focused on the level of water uptake in a material or tuning the sorption isotherm shape,[13-18] rather than the kinetics of the WHC.

SUMMARY OF THE INVENTION

The invention provides systems and methods for water harvesting using an atmospheric water harvesting system to convert surrounding air into liquid water.

In some aspects, provided is an atmospheric water harvesting system that is capable of continuously cycling between an adsorption mode followed by a desorption mode.

In certain aspects, the system comprises: a sorbent cartridge; at least one heating element; at least one adsorption fan; at least one desorption fan; and a condenser.

In some embodiments, the sorbent cartridge comprises: a plurality of trays; and a plurality of spacers. In some variations, the plurality of trays are stacked one on top of each other. In certain variations, each tray has a permeable membrane that holds water capture material. The plurality of trays form a box with four sides: an adsorption entry side, an adsorption exit side, a desorption entry side, and a desorption exit side. The adsorption entry side and the adsorption exit side opposite to each other, and the desorption entry side and the desorption exit side are opposite to each other. In some variations, a plurality of spacers are positioned between every other tray on the adsorption entry side to create a set of adsorption channels; and a plurality of spacers positioned between every other tray on the desorption entry side to create a set of desorption channels. In one variation, the set of adsorption channels are separated from and orthogonal to the set of desorption channels, which prevents the leakage of desorbed moisture into the adsorption channels.

In some variations, the at least one adsorption fans are positioned near the adsorption entry side, and the at least one desorption fans are positioned near the desorption entry side. In some variations, the condenser is positioned near the desorption exit side.

In some embodiments, the at least one heating element positioned externally to the plurality of trays. In one embodiment, the at least one heating element is at least solar heaters. In some variations of the foregoing, when the system is operating in the adsorption mode, the at least one adsorption fans are configured to direct surrounding air through the adsorption channels, and at least a portion of the water capture material on each tray adsorbs moisture from the surrounding air. Then, when the system is operating in the desorption mode, the at least one heating element is configured to provide heated air, and the at least one desorption fans are configured to direct heated air through the desorption channels that causes release of water vapor from at least a portion of the water capture material. The at least one desorption fans also help to direct released water vapor towards the condenser, which is configured to condense the water vapor released through the desorption channels and to produce liquid water.

In other embodiments, the at least one heating element positioned within the plurality of trays. In certain embodiments, the at least one heating element is incorporated into the plurality of trays, and in contact with at least a portion of the water capture material. In one embodiment, the at least one heating element is at least one resistive heater. In some variations of the foregoing, when the system is operating in the adsorption mode, the at least one adsorption fans are configured to direct surrounding air through the adsorption channels, and at least a portion of the water capture material on each tray adsorbs moisture from the surrounding air. Then, when the system is operating in the desorption mode, the at least one heating element is configured to provide heat that causes release of water vapor from at least a portion of the water capture material. The at least one desorption fans also help to direct released water vapor towards the condenser, which is configured to condense the water vapor released through the desorption channels and to produce liquid water.

In certain aspects, provided herein is a sorbent cartridge comprising the plurality of trays and the plurality of spacers, which form a set of adsorption channels separated from and orthogonal to a set of desorption channels, as described herein.

In other aspects, provided are also methods of harvesting water from surrounding air using the atmospheric water harvesting systems herein. In some embodiments, the method comprises: directing surrounding air through the adsorption channels in the adsorption mode, wherein at least a portion of the water capture material adsorbs moisture from the surrounding air; heating air using the at least one heating element to produce heated air; directing the heated air through the desorption channels to release water vapor from at least a portion of the water capture material in the desorption mode; and condensing the released water vapor using the condenser to produce liquid water.

In other embodiments, the method comprises: directing surrounding air through the adsorption channels in the adsorption mode, and wherein at least a portion of the water capture material adsorbs moisture from the surrounding air;

heating the water capture material using the at least one heating element in the desorption phase to release water vapor from at least a portion of the water capture material; directing the released water vapor through the desorption channels towards the condenser; and condensing the released water vapor using the condenser to produce liquid water.

BRIEF DESCRIPTION OF THE FIGURES

FIGS. 1A and 1B relate to water sorption properties of MOF-303.

FIG. 1A depicts a graph showing water adsorption at 30° C. and 20-40% relative humidity (RH): The initial 95% filling are approximated with a mono-exponential fit (dashed lines). The curve for Al-fumarate at 20% RH is not fitted due to insufficient water uptake at this RH. FIG. 1B depicts a graph showing water desorption at 65, 85 and 120° C., and 0% RH.

FIGS. 4A-4D relate to water harvesting cycle (WHC) as operated by the atmospheric water harvester.

FIGS. 5A-5D relate to atmospheric water harvesting in the Mojave Desert, as described in Example 2.

DETAILED DESCRIPTION OF PARTICULAR EMBODIMENTS

The following description sets forth exemplary methods, parameters and the like. It should be recognized, however, that such description is not intended as a limitation on the scope of the present disclosure but is instead provided as a description of exemplary embodiments.

In some aspects, provided herein are atmospheric water harvesting systems capable of continuous operation, conducting multiple adsorbent-assisted WHCs per day. The systems provided herein may be powered by solar electricity. For example, in some variations when the systems provided herein is equipped with metal-organic frameworks (MOFs) as the water capture material, the system can generate at least 1 L/$kg_{MOF}$/day in an indoor arid environment. The systems can operate for days in arid environments, and produce water with a tenfold increase in productivity compared to previous studies.[12] The systems provided herein can harvest atmospheric water and deliver such water to regions facing severe water stress.

In certain aspects, provided is an atmospheric water harvesting system that is capable of continuously cycling between an adsorption mode followed by a desorption mode. In some embodiments, the system comprises: a sorbent cartridge configured to provide cross-flow for adsorption and desorption airflow pathways; at least one heating element; at least one adsorption fan; at least one desorption fan; and a condenser.

Figure 8:
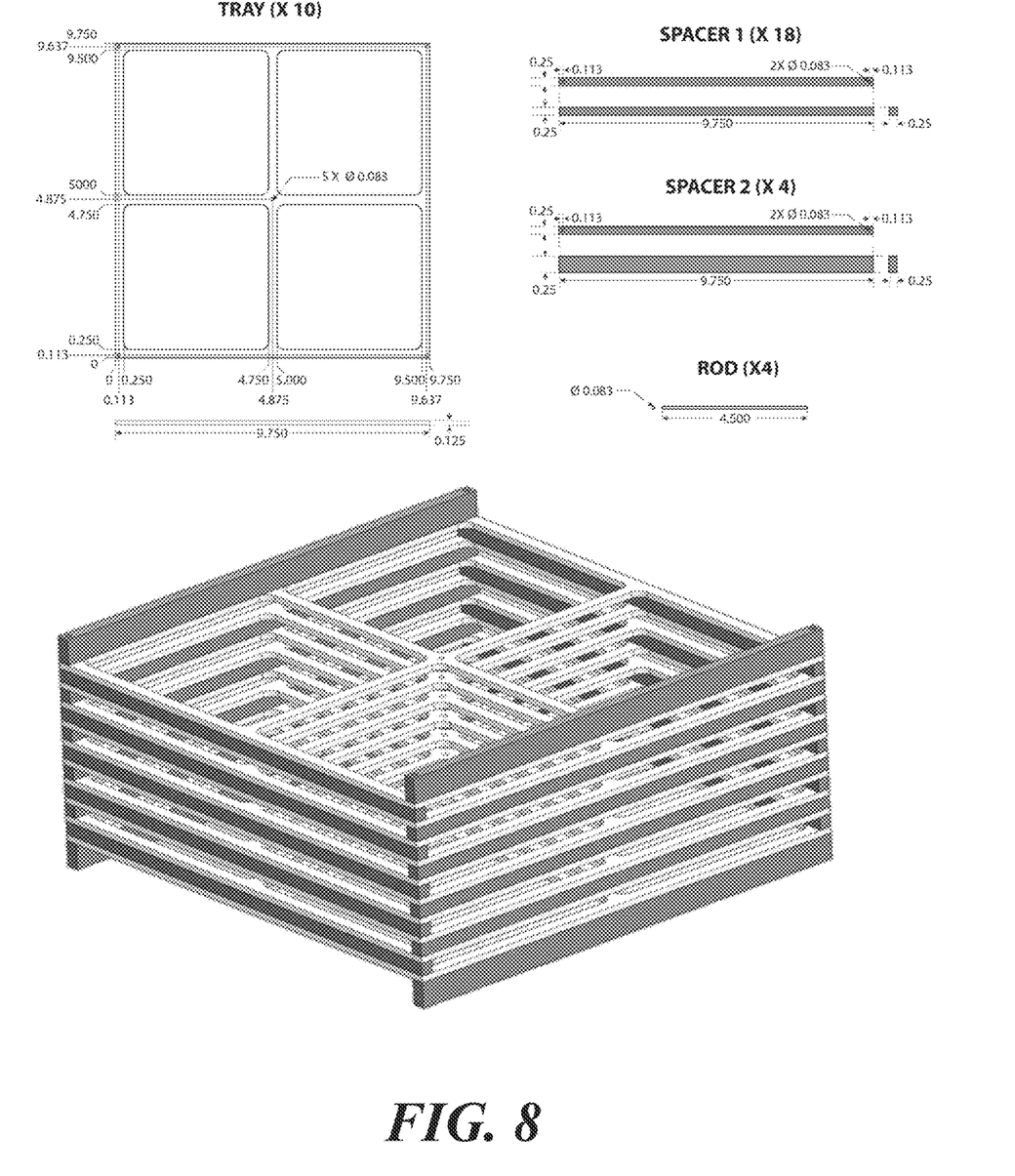
FIG. 8. Blueprints of the component of the sorbent cartridge, and illustration of the assembled cartridge containing 10 trays, 18 thin spacers, 4 wide spacers and 4 rods to hold the cartridge together. The PTFE membranes lining the tray and the sorbent powder they contain are omitted for clarity. All distances are in inches.

In one aspect, provided is an atmospheric water harvesting system comprising: a sorbent cartridge that holds water capture material. With reference to FIG. 8, an exemplary sorbent cartridge is depicted. In some embodiments, the sorbent cartridge comprises stacked trays, which can be filled with the water capture material. In some variations, the sorbent cartridge is made of thermally insulating material. In one variation, the sorbent cartridge is made of any lightweight, thermally insulating material. The sorbent cartridge may be used in the atmospheric water harvesting system to provide support for the water capture materials, including the membranes on which the water capture materials are held; and to provide cross-flow adsorption and desorption airflow pathways.

Figure 7:
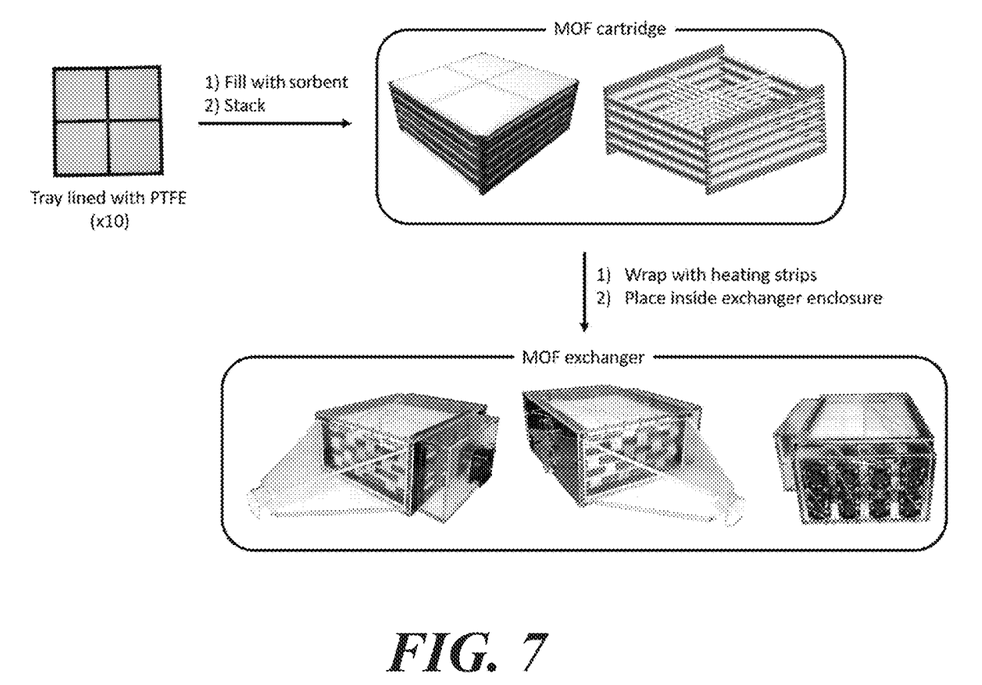
FIG. 7. General scheme describing the assembly steps for the sorbent exchanger.

With reference to FIG. 7, depicted are trays lined with at least one membrane used to hold the water capture material. The tray may be lined with the membrane at the top and/or the bottom. In some variations, the membrane is a microporous membrane. In certain variations, the membrane comprises organic polymer, paper, or cellulose, or any combination thereof. Each tray is filled with water capture material. The membranes help to hold the water capture material. In some embodiments, the membranes are permeable, allowing air to flow through the whole tray.

As depicted in FIG. 7, the trays are stacked on top of each other, but separated using spacers, which results in two sets of channels that are orthogonal to each other. One set of channels is used for adsorption, and one set of channels for desorption. The adsorption and desorption channels are separated from each other completely, which prevents the leakage of desorbed moisture into the adsorption channels.

Figure 6A:
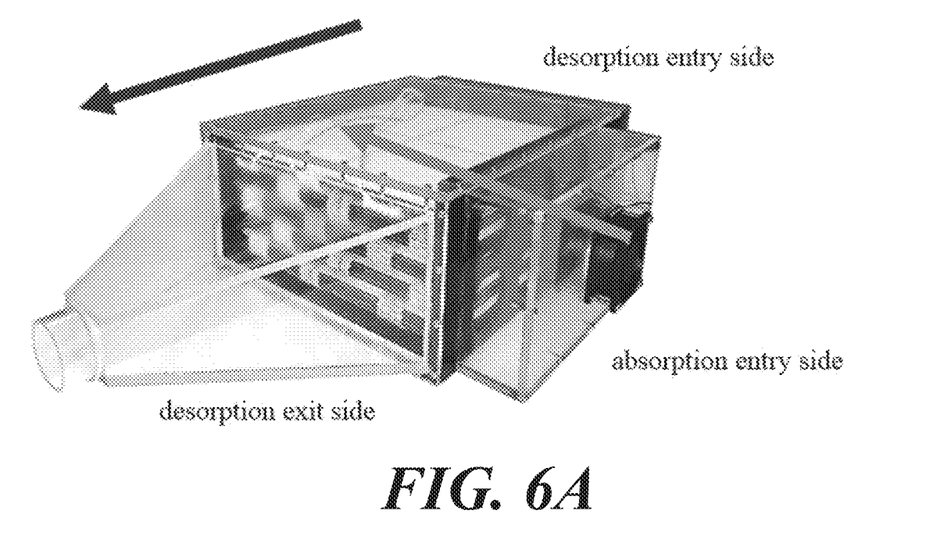
FIGS. 6A-6C depict an exemplary exchanger from three different viewpoints. The exchanger includes a plurality of trays and a plurality of spacers, arranged to provide cross-flow for adsorption and desorption airflow pathways.
Figure 6B:
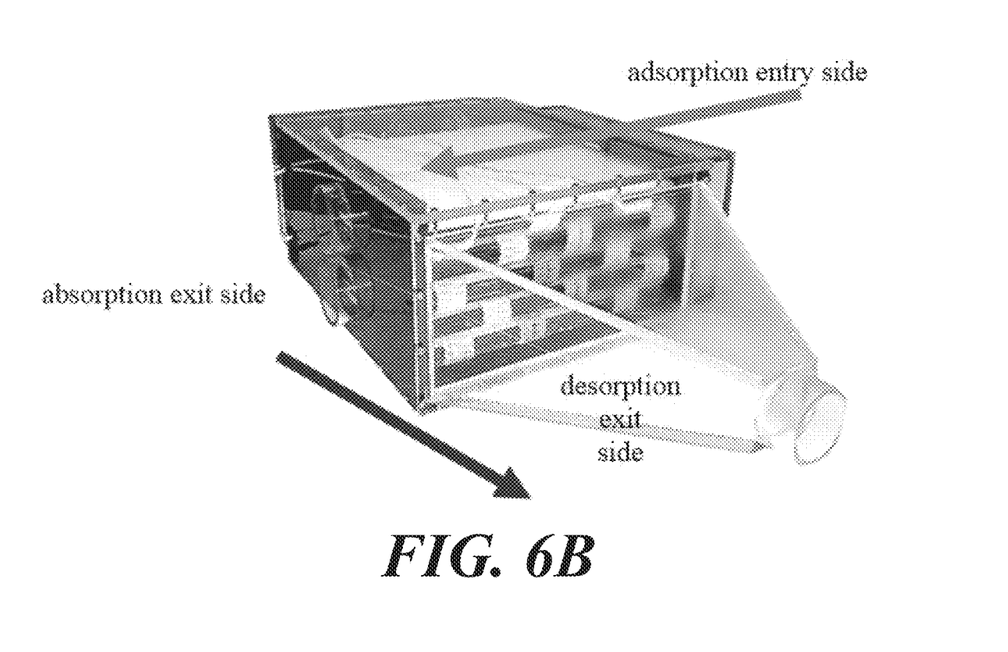
Figure 6C:
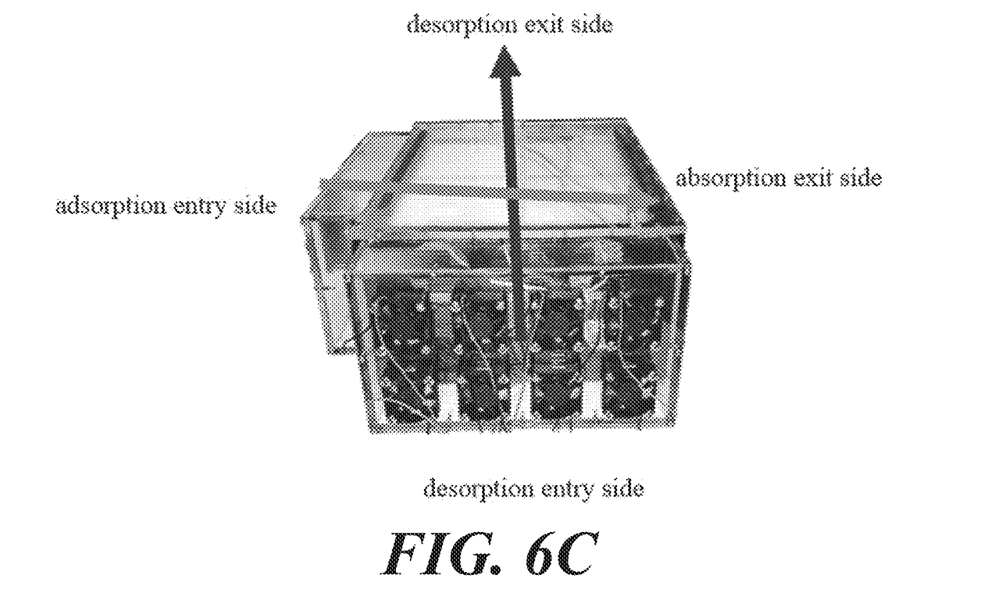

With reference to FIGS. 6A-6C, an exemplary exchanger is depicted from three different viewpoints. The exchanger includes the plurality of trays, the plurality of spacers and adsorption and desorption fans. The plurality of trays form a box with four sides: an adsorption entry side, an adsorption exit side, a desorption entry side, and a desorption exit side. As depicted in FIG. 6C, the adsorption entry side and the adsorption exit side opposite to each other, and the desorption entry side and the desorption exit side are opposite to each other.

In some embodiments, the atmospheric water harvesting system further comprises: adsorption fan(s) positioned near the adsorption entry side; desorption fan(s) positioned near the desorption entry side; and condenser(s) positioned near the desorption exit side. In some variations, one adsorption fan is used; and a plurality of desorption fans are used. In other variations, one adsorption fan is used; and one desorption fan is used. In other variations, a plurality of adsorption fans are used; and one desorption fan is used. In yet other variations, a plurality of adsorption and desorption fans are used.

In some embodiments, the atmospheric water harvesting system further comprises: at least one heating element. In certain embodiments, the heating element(s) may be positioned externally to the plurality of trays. Suitable external heating elements including, for example, solar heaters. When the system is operating in the adsorption mode, in some variations, the adsorption fans direct surrounding air through the adsorption channels, and at least a portion of the water capture material on each tray adsorbs moisture from the surrounding air. Then, when the system is operating in the desorption mode, the heating element(s) is/are configured to provide heated air, and the desorption fans are configured to direct heated air through the desorption channels that causes release of water vapor from at least a portion of the water capture material. The desorption fans also help to direct released water vapor towards the condenser, which condenses the water vapor released through the desorption channels and to produce liquid water.

In other embodiments, the heating element(s) may be positioned within the plurality of trays. In some variations, the heating element(s) is/are incorporated into the plurality of trays, and in contact with at least a portion of the water capture material. Examples of heating elements that can be positioned within the trays include, for example, resistive heaters. When the system is operating in the adsorption mode, in some variations, the adsorption fans are configured to direct surrounding air through the adsorption channels, and at least a portion of the water capture material on each tray adsorbs moisture from the surrounding air. Then, when the system is operating in the desorption mode, the heating element(s) provide heat that causes release of water vapor from at least a portion of the water capture material. The desorption fans also help to direct released water vapor towards the condenser, which condenses the water vapor released through the desorption channels and to produce liquid water.

In some embodiments, the atmospheric water harvesting system further comprises: a power source, such as photovoltaic solar panels. The some variation, the power source may be used to power the fans and/or the condenser. In other variations, the power source may be an electrical source, or a combination of power sources may also be used.

In some embodiments, the atmospheric water harvesting system further comprises: a water collection tank and/or water storage tank. In other variations, the system further comprises: at least one sensor and at least one controller. For example, in one variation, the sensor(s) may be used to detect the saturation level of the water capture material in desorption mode. The sensors feed data to the controller, which then turns on the heating element(s) when a predetermined saturation level is reached. The controller may also be used to turn fans on and off in adsorption mode.

Any suitable water capture material may be used in the systems described herein. In some embodiments, the water capture material comprises an active chemical compound. In some embodiments, such material captures moisture from air from the surroundings and then releases the captured moisture to the surroundings under external stimuli including but not limited to heating, moisture vapor pressure change or UV-radiation. The active chemical compound may be an ionic or covalent porous solid, including but not limited to metal-organic and organic porous framework materials, zeolites, organic ionic solids, inorganic ionic solids, organic molecular solids, or inorganic molecular solids. In some variations, the active chemical compound has a low heat capacity, high thermal conductivity and hydrothermal stability. It may be used in a pure, single phase form, as a composition of different active chemical materials, and/or in combination with performance enhancing additives modulating its properties. Performance enhancing additives may include materials with a high thermal conductivity and molar absorptivity. The active chemical compound may be used in the form of a powders, extrudates, molded bodies, pressed pellets, pure or composite films, or sintered bodies.

In some embodiments, the water capture material comprises metal-organic frameworks, also referred to in the art as MOFs. MOFs are porous materials that have repeating secondary building units (SBUs) connected to organic ligands. In some variations, the SBUs may include one or more metals or metal-containing complexes. In other variations, the organic ligands have acid and/or amine functional group(s). In certain variations, the organic ligands have carboxylic acid groups.

Any suitable MOFs capable of adsorbing and desorbing water may be employed in the systems provided herein. In one variation, MOF-303 may be used, which has a structure of Al(OH)(HPDC), where HPDC stands for 1H-pyrazole-3, 5-dicarboxylate. Other suitable MOFs may include, for example, MOF-801, MOF-841 and MIL-160. See e.g., Furukawa et al., J. Am. Chem. Soc. 2014, 136, 4369-4381. A combination of MOFs may also be used.

In some variations, the MOFs have pore sizes between about 0.5 nm about 1 nm, or between about 0.7 nm to about 0.9 nm. In certain variations, the MOFs have a hydrophilic pore structure. In certain variations, the MOFs have a hydrophilic pore structure comprising acid and/or amine functional groups. In certain variations, the MOFs have 1D channels that allow for reversible water adsorption.

In some variations, the water capture material comprises at least one MOF and graphite. Any combinations of the water capture materials described herein may also be used.

In some variations, the systems described herein may be run as a one-bed system and/or two-bed system, alternating adsorption and desorption regimes. In some variations, the systems may run adsorption and desorption simultaneously.

The systems and methods described herein provide an advantage of avoiding the use of moving parts, such as valves or doors, to navigate airflows for adsorption and desorption. In some variations, the systems described herein are also capable of multiple water harvesting cycles per day.

EXAMPLES

The following examples are merely illustrative and are not meant to limit any aspects of the present disclosure in any way.

Example 1: Comparison of Water Adsorption Kinetics for Various Water Capture Materials In this example, the water adsorption kinetics of several microporous materials were studied. An aluminum-based MOF, MOF-303 [Al(OH)(pzdc), pzdc=1H-pyrazole-3,5-dicarboxylic acid] was found to outperform commercially available sorbents (zeolite 13X, SAPO-34) and emerged as a candidate for efficient water harvesting through rapid cycling.

Figure 1A:
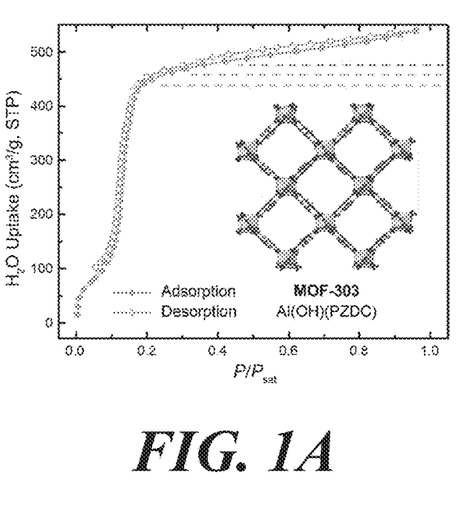
FIG. 1A depicts a water sorption isotherm at 30° C.
Figure 1B:
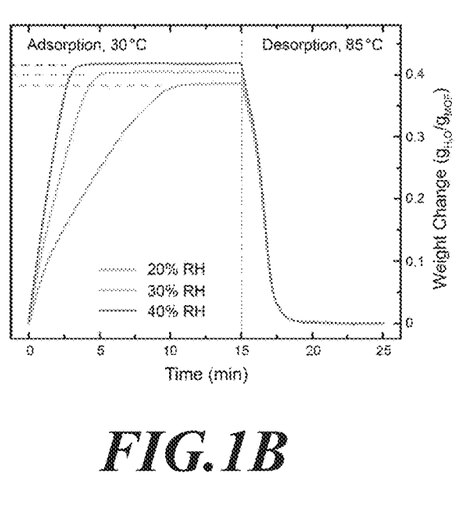
FIG. 1B depicts a dynamic vapor sorption properties of a thin MOF layer: Adsorption at 30° C. and 20-40% relative humidity (RH) and subsequent desorption at 85° C. and 0% RH.

MOF-303 was found to exhibit a water uptake of 39 wt % at 20% RH, an inflection point at 12% RH, minimal to no hysteresis in its water sorption behavior (FIG. 1A), and an isosteric heat of adsorption of ~52 kJ/mol, allowing for high working capacity and facile regeneration. Additionally, no measurable decrease in capacity was observed after 150 adsorption-desorption cycles, indicating excellent long-term stability.[12] Initial dynamic adsorption tests conducted on a thin layer of this material with help of a thermogravimetric analyzer (TGA) under constant humidified air flow revealed full saturation at 20% RH after ~10 minutes (5 and 3 minutes at 30 and 40% RH, respectively, FIG. 1B).

Figure 2:
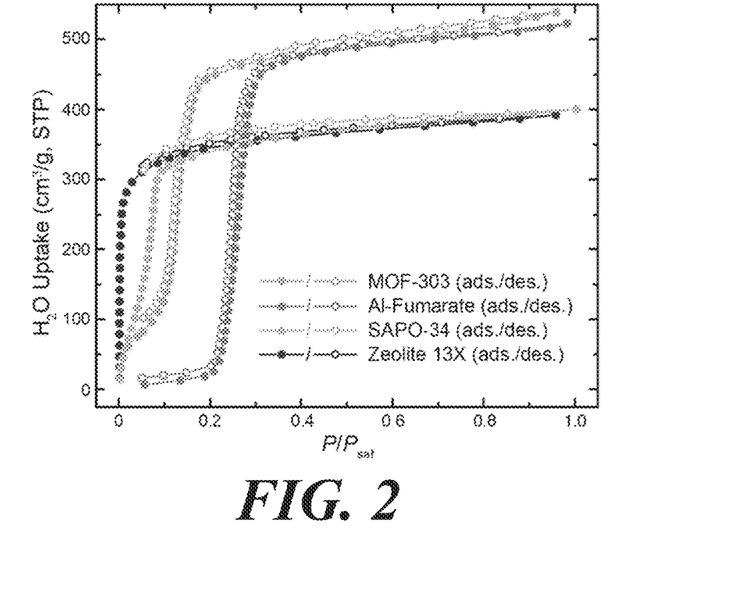
FIG. 2 depicts a water sorption isotherms at 30° C. of the tested materials. P: partial water vapor pressure; $P_{sat}$: saturated water vapor pressure at 30° C.

To put these results in perspective with the dynamic sorption performance of other microporous materials, a comparative study was conducted aiming at determining which material has the best properties to perform fast WHCs. This was done in a thin sorbent bed geometry, which is more compatible with the application in a full-scale device. The selected materials were MOF-303, Al-fumarate [Al(OH)(fumarate), Basolite A520, BASF SE][22], and the commercially available zeolites SAPO-34 and zeolite 13X, all hydrophilic materials viable for water uptake under arid conditions, as evidenced by their respective water sorption isotherm (FIG. 2).

In this example, the materials were all processed in layers with a constant height of 3 mm and a packing porosity of 0.7. The sorbent density, necessary for accurate adaptation of the targeted packing porosity, was determined by using argon sorption measurements and helium gas pycnometry. Furthermore, the grain size of each MOF was synthetically adjusted to match the zeolite particle size (2-5 μm diameter).

Figure 3A:
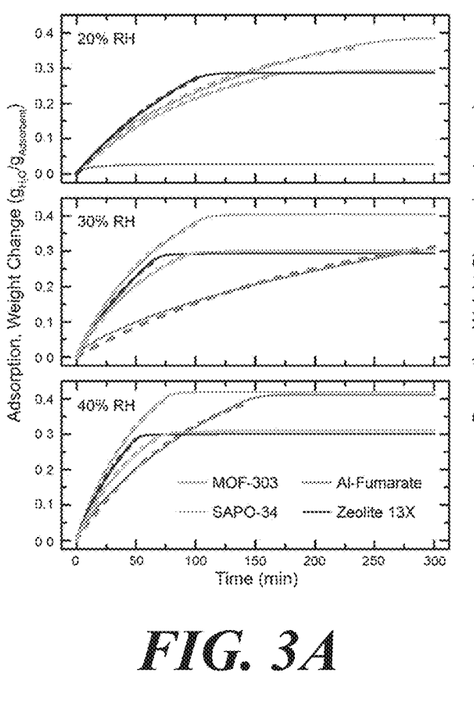
FIGS. 3A and 3B relate to comparative dynamic water sorption. The experimental data is represented by solid lines.

The dynamics of water vapor sorption were assessed under a range of conditions for the four materials and reproducibility of the results was verified by duplicate measurements. The water adsorption process was monitored at 30° C. and 20-40% RH (FIG. 3A). The water uptake over time exhibited an apparent mono-exponential behavior that was fitted accordingly (with $R^2 > 99\%$ for all fits, see FIG. 3A). Two parameters were extracted from this fit: i) apparent maximal uptake $W_{max}$ and ii) characteristic adsorption time τ. The quotient of these two parameters $W_{max}/τ$, corresponding to the first derivative of the adsorption curve at t=0, as the adsorption coefficient of performance $P_{ads}$ were defined (Table 1).

TABLE 1

Fitting parameters of the dynamic water adsorption behavior.

$$w(t) = w_{max} \cdot \left[1 - \exp\left(-\frac{t}{\tau}\right)\right] \quad (1)$$

$$P_{ads} = \frac{w_{max}}{\tau} \quad (2)$$

| Adsorbent | RH (%) | $w_{max}\left(\frac{g_{H_2O}}{g_{Adsorbent}}\right)$ | τ (min) | $P_{ads,norm}$ |
|---|---|---|---|---|
| MOF-303 | 20 | 0.4166(5) | 119.6(3) | 1.0 |
|  | 30 | 0.4837(5) | 66.20(1) | 2.1 |
|  | 40 | 0.5190(5) | 51.47(9) | 2.9 |
| Al-Fumarate | 30 | 0.4177(4) | 217.9(4) | 0.6 |
|  | 40 | 0.5034(6) | 97.1(2) | 1.5 |
| SAPO-34 | 20 | 0.3566(3) | 108.0(2) | 0.9 |
|  | 30 | 0.3745(5) | 63.18(1) | 1.7 |
|  | 40 | 0.3896(6) | 50.49(1) | 2.2 |
| Zeolite 13X | 20 | 0.4638(7) | 114.5(2) | 1.2 |
|  | 30 | 0.4551(9) | 71.3(2) | 1.8 |
|  | 40 | 0.4432(9) | 48.36(1) | 2.6 | w(t): water uptake at time t.
$w_{max}$: apparent maximal water uptake.
τ. characteristic adsorption time.
$P_{ads}$: coefficient of adsorption performance.
$P_{ads,norm}$: normalized coefficient of adsorption performance (normalized to 1.0 for MOF-303 at 20% relative humidity, RH).

Figure 3B:
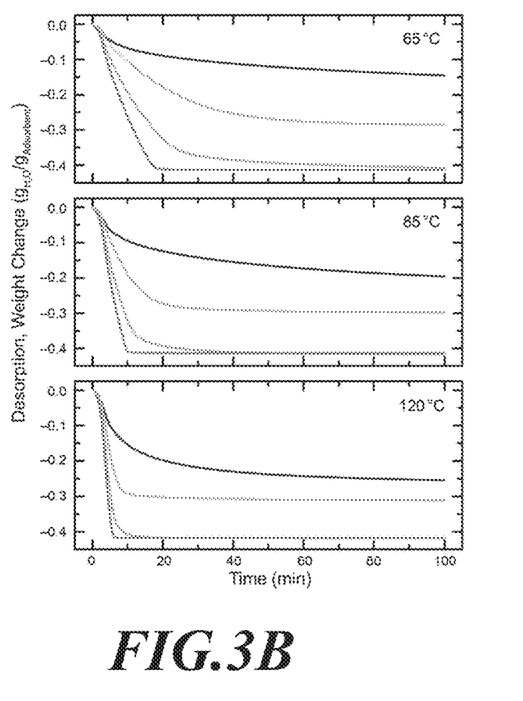

It was observed that this coefficient, although qualitative, accurately reflected the gravimetric water uptake behavior at any given time (FIG. 3A) and the corresponding normalized value $P_{ads,norm}$ (normalized to 1.0 for MOF-303 at 20% RH, Table 1) was used hereafter to discuss and compare the kinetic adsorption properties of the candidate materials. The desorption behavior was not approximated by a function due to interference of the fast, but not instantaneous, TGA oven temperature increase with the simultaneous, rapid desorption process exhibited by some materials (e.g., Al-fumarate). Nevertheless, clear desorption kinetic trends were also observed (FIG. 3B).

The water adsorption process was observed to be faster with increasing RH for all tested materials, but different trends in the relative performances of the different sorbents were observed at different humidities. At 20% RH, zeolite 13X was observed to outperform the other materials tested in this study ($P_{ads,norm}$=1.2). While this behavior could be attributed to the strong hydrophilicity of the material, reflected in its Type I water sorption isotherm (FIG. 2), also noted is that MOF-303 exhibited more favorable adsorption kinetics than SAPO-34 (1.0 versus 0.9, respectively), despite the inflection point of the latter lying at lower relative pressures. The uptake of Al-fumarate at this RH is negligible and thus was not considered in the quantitative comparison. At higher RH (30 and 40%), the adsorption kinetics of MOF-303 was observed to be the most favorable (2.1 and 2.9), followed by zeolite 13X (1.8 and 2.6) and SAPO-34 (1.7 and 2.2). Al-fumarate exhibited very slow adsorption kinetics at 30% RH (0.6), close to the inflection point in its water sorption isotherm (FIG. 2). Under the given experimental setup, it equilibrated only after ~10 hours. Strikingly, even at 40% RH, despite its water uptake, pore diameter and pore volume being comparable to MOF-303 (FIG. 2), Al-fumarate exhibited much less favorable dynamic vapor adsorption properties (1.5) compared to MOF-303 and the zeolites (FIG. 3A). This behavior could stem from its less hydrophilic pore environment, reflected in a relatively high inflection point (FIG. 2).

Prior to desorption, all samples were equilibrated at 30° C. and 40% RH to ensure comparability between the measurements, and the desorption process was then monitored at temperatures ranging from 65 to 120° C. Water was observe to desorb faster at higher temperatures. At 65° C., complete dehydration required only 20 min for Al-fumarate (FIG. 3B) and several hours for MOF-303, while the zeolites remained partially saturated within the timeframe of the measurement. MOF-303 was observed to be more competitive at 85° C. with a complete desorption time of ~1 hour, which can be further shortened at higher temperatures (FIG. 3B). In contrast, complete dehydration of SAPO-34 was only achieved by heating at temperatures above 100° C., and zeolite 13X could not be fully desorbed within 10 hours, even at 120° C. This signals an important limitation of the working capacity of zeolite 13X under mild desorption temperatures. For instance, there is a decrease of ~30% in the working capacity if the zeolite is desorbed at 85° C. for 2 hours (FIGS. 3A-3B). Additionally, the next adsorption cycle would necessarily start with a partially saturated material, which, due to the exponential nature of the process, would result in a consequent slowdown in its cycling dynamics.

The experimental results presented here provided a simulation of the dynamic adsorption and desorption behavior of each sorbent when cycled rapidly under arid conditions, and thus allowed us to predict which material was the best candidate for the targeted application, namely MOF-303. MOF-303 exhibited a good performance at 20% RH, only outperformed by the highly hygroscopic zeolite 13X, and it displayed the fastest uptakes at 30 and 40% RH. Further, a 3 mm packed bed of MOF-303 was completely dehydrated within minutes of mild heating (85-100° C.).

Example 2. Use of MOF-303 in Atmospheric Water Harvester with Cross-Flow Configuration MOF-303 was used as an exemplary water capture material in a full-size atmospheric water harvester. This apparatus was designed to take advantage of the initial, fastest part of the adsorption process, followed by full desorption of the partially filled MOF bed under forced convective heating.

Figure 4A:
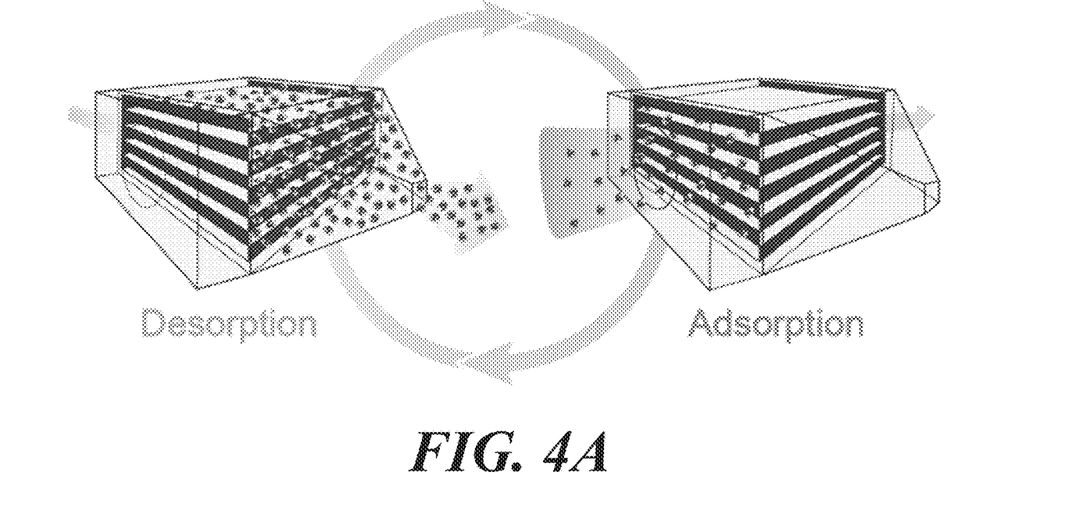
FIG. 4A is an illustration of the WHC. During the desorption step, the MOF bed is heated to release water vapor, which is immediately transferred to the condenser under convective air flow. During the adsorption step, ambient air is propelled, through forced convection across the exchanger, to adsorb vapor inside of the microporous MOF sorbent.
Figure 4B:
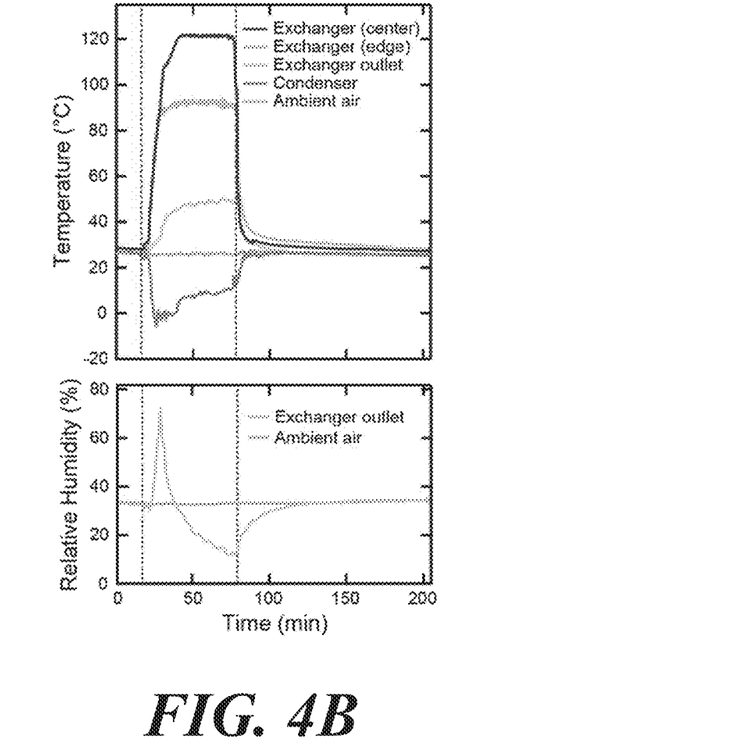
FIG. 4B is a graph showing evolution of temperature and relative humidity (RH) during a typical WHC, as measured by sensors at different locations in the harvester. Desorption (FIG. 4C) and adsorption (FIG. 4D) kinetics, in terms of mass of water per mass of sorbent vs. time, measured for MOF-303 under different ambient RH. The ambient temperature was measured to be 25±2° C. for all experiments.
Figure 4C:
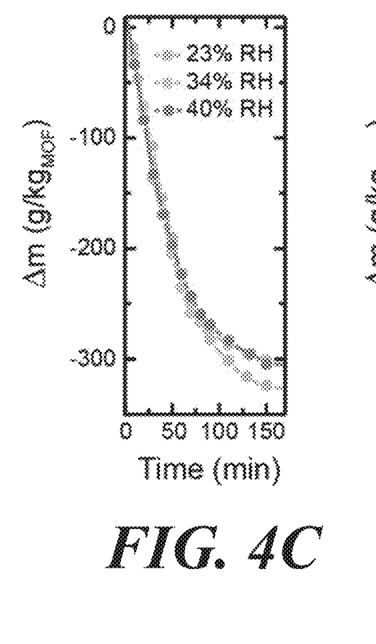
Figure 4D:
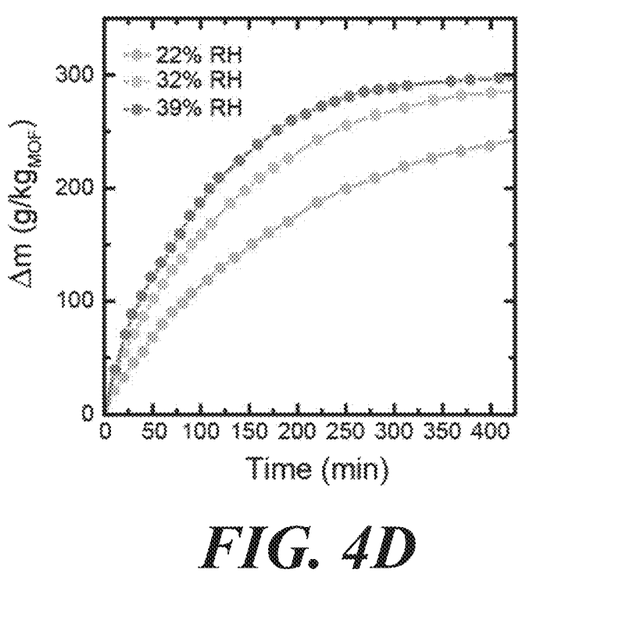
Figure 5A:
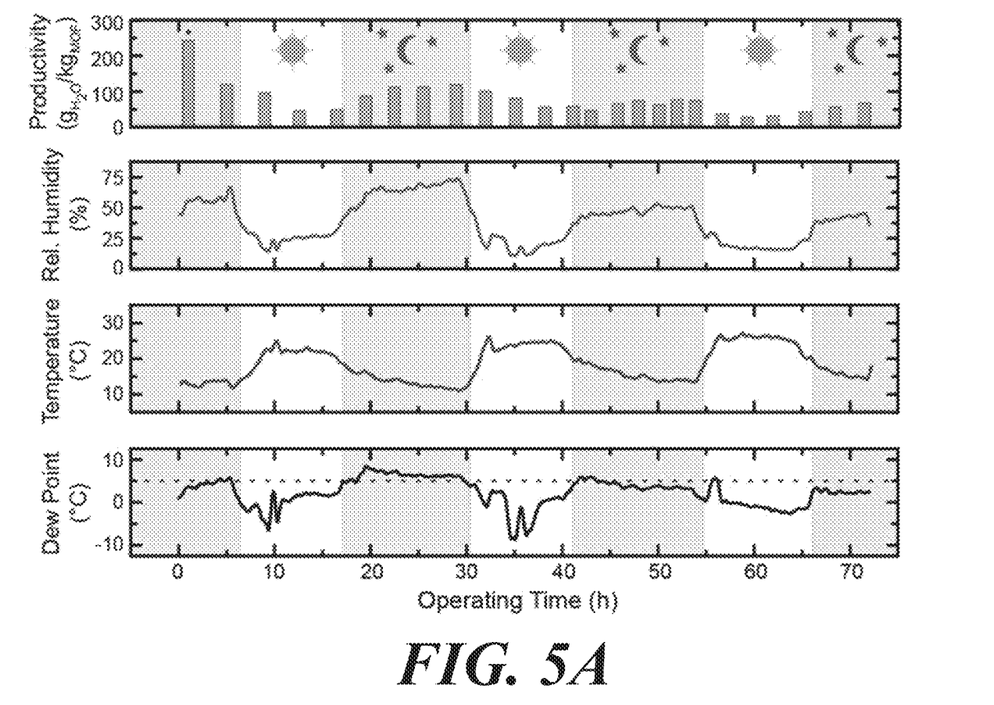
FIG. 5A is a diagram displaying the water harvesting productivity after each WHC, the ambient RH and temperature, and the corresponding dew point. The productivity of the first WHC (*) is higher because the experiment started with a fully saturated MOF bed. All data were measured over the course of three continuous days of operation in the Mojave Desert.
Figure 5B:
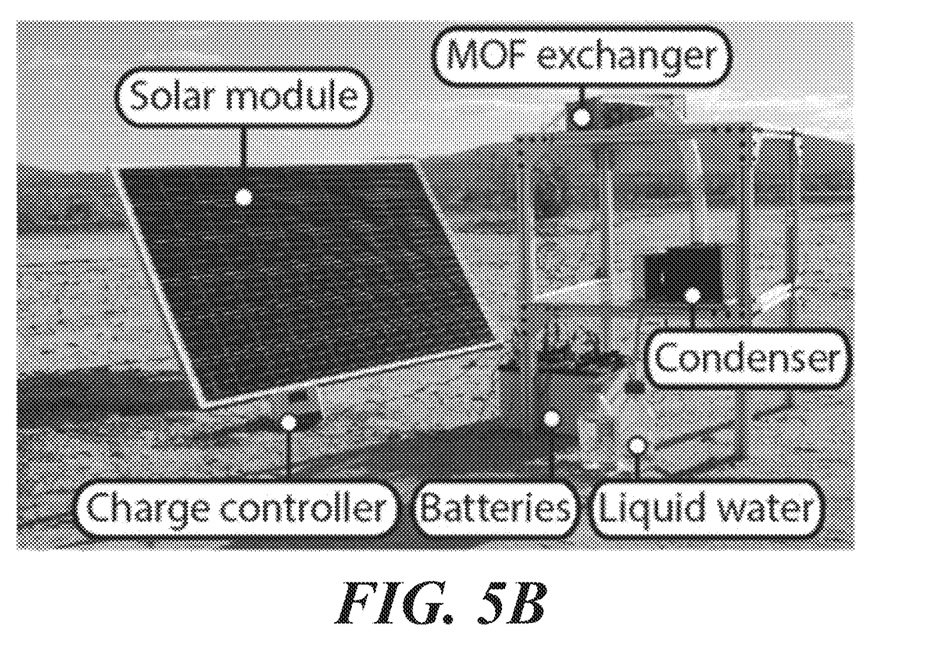
FIG. 5B is a photograph of the water harvester with labeled parts. Close-up views of the MOF exchanger (FIG. 5C) and the water collected after three days of operation (FIG. 5D).
Figure 5C:
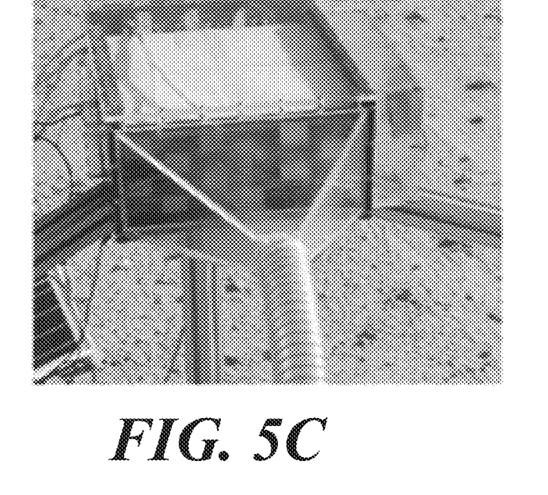

The atmospheric water harvester was built around a fan-equipped exchanger hosting 0.455 kg of activated MOF-303 powder, packed into forty 4.5×4.5×0.25 in$^3$ (10.16× 10.16×0.635 cm$^3$) beds supported by ten trays and assembled into a removable cartridge, which was further fitted with heating strips (see, FIG. 5C). The circulation of water molecules through this exchanger, primarily designed to facilitate mass and heat transfer between the MOF and the ambient air, is illustrated in FIG. 4A. During desorption, ambient air is propelled uniformly across the unit through forced convection and the MOF bed is concurrently heated to 80-120° C. to trigger the release of water vapor. The generated hot and humid air is subsequently transferred to a condenser. During the adsorption phase, ambient air is propelled through the MOF exchanger in an orthogonal direction compared to the desorption phase and the activated MOF spontaneously extracts vapor from the air by capturing water molecules in its pores. The evolution of temperature and RH during a WHC was monitored by thermocouples and humidity sensors at different locations in the harvester (FIG. 4B). To investigate the sorption kinetics in the MOF bed, variations in mass of exchanger associated with water adsorption and desorption were monitored over time under different temperatures and relative humidities (FIGS. 4C and 4D). Active heating of the MOF bed during desorption resulted in a fast process, where, independent of ambient conditions, a saturated bed could always be fully desorbed in less than three hours (see FIG. 4C). However, we note that MOF-303 was only partially desorbed under these conditions and released at best 85% of its total uptake, which can be rationalized by the presence of a spatial heat gradient inside the exchanger during the desorption step, especially around the edges of the exchanger (see FIG. 4B), resulting in parts of the MOF not being exposed to sufficiently high temperatures for complete dehydration.

Furthermore, the adsorption kinetics, displayed in FIG. 4D, was observed to vary significantly as a function of ambient RH and were found to be consistent with the general trend reported in FIGS. 3A-3B. However, complete water uptake was only achieved after 300 min at 39% RH, 400 min at 32% RH, and was not achieved within 450 min at 22% RH. The speed of adsorption and desorption measured in the exchanger were found to be suitable for operating multiple WHCs per day with the water harvester. The prototype, equipped with MOF-303, was therefore tested indoors under continuous operation for 24 hours.

During the experiment, each desorption phase was terminated when the RH at the outlet of the exchanger reached a constant value, while the length of each adsorption phase was adjusted as a function of ambient conditions, based on the data presented in FIGS. 4A-4D, and the amount of liquid water collected after each WHC was measured. Under average conditions of 32% RH and 26° C., the system was capable of extracting a total of 1.3 L/kg$_{MoF}$ after nine WHCs, corresponding to a significant improvement in productivity over the most recent reports on atmospheric water harvesters operating in arid conditions.[26-28] The efficiency of condensation was estimated to be ~85%, based on the ratio of collected liquid water over desorbed water vapor. Moreover, the modularity and applicability of the device architecture to different sorbents was demonstrated by replacing the cartridge of MOF-303 by a cartridge of Al-fumarate, and the system was again operated continuously for 24 hours under 32% RH and 23° C. While Al-fumarate exhibits a similar total water uptake to MOF-303 under these conditions (FIG. 2), it was only able to deliver 0.55 L/kg$_{moF}$, as anticipated from the difference in dynamic behavior between the two materials, emphasizing the crucial importance of fast sorption kinetics to achieve high productivities.

Figure 5D:
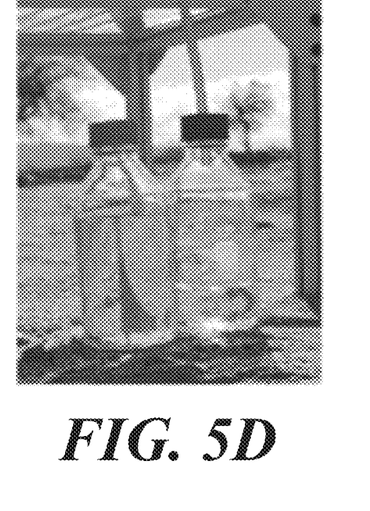

To further demonstrate the viability of the system under practical conditions, the system was tested in the Mojave Desert, the most arid region in Northern America. The system was operated continuously for three days in the hyperarid environment of Twenty-Nine Palms, California (34°10'51.4"N; 115°54'40.0"W) and was powered by four 12 V deep-cycle batteries that could be charged during the day by a photovoltaic module (see FIG. 5B). The productivity after each cycle, along with the corresponding ambient conditions, are displayed in FIG. 5A. Importantly, over the three days of water collection, the dew point of the ambient air remained below 5° C. (i.e. outside the operating range of direct condensation technologies[9]) for 85% of the time. Surprisingly, MOF-303 was found to harvest atmospheric water under conditions as dry as 10% RH and 27° C., corresponding to a dew point of −4° C. On average, this system was able to produce 0.7 L/kg$_{MOF}$/day (see FIG. 5D), which represents a tenfold improvement over the previous generation of MOF-assisted water harvester.[12]

This example demonstrated that water capture materials for water harvesting from desert air should not only be optimized for high uptakes at low relative humidities, but also for fast ad- and desorption kinetics, which consequently allows to perform rapid and efficient cycling to attain high water harvesting productivities. The average power consumption of the system in this example was estimated to be ~100 W. However, in other variations of the system, the power consumption per produced amount of water may be reduced by, for example: i) harnessing the heat released by the condenser and funneling it back into the MOF exchanger during desorption; ii) processing the MOF into thinner beds or films to allow for even shorter and more frequent WHCs; or iii) optimization of the device geometry and employed materials for more efficient mass transfer between the sorbent and the feed air. Operating the water harvester exclusively at night, when the productivity is the highest, could also result in a more energy-efficient water extraction. Overall, the performance criteria and design principles realized in this example translate into practical and significantly improved production of liquid water through atmospheric water harvesting, operated by a system able to efficiently function in arid climates and deliver volumes of water approaching the daily requirements for human consumption.

REFERENCES (1) World Health Organization. Health Topics: Health Impact Assessment. World Heal. Organ. 2019.
(2) WWAP (UNESCO World Water Assessment Programme). 2019. The United Nations World Water Development Report 2019: Leaving No One Behind; Paris, 2019.
(3) Hoekstra, A. Y.; Mekonnen, M. M. The Water Footprint of Humanity. 2012, 109 (9).
(4) Famiglietti, J. S. The Global Groundwater Crisis. Nat. Clim. Chang. 2014, 4 (11), 945-948.
(5) Voss, K.; Swenson, S.; Rodell, M.; Richey, A. S.; Thomas, B. F.; Lo, M.-H.; Reager, J. T.; Famiglietti, J. S. Quantifying Renewable Groundwater Stress with GRACE. Water Resour. Res. 2015, 51 (7), 1-22.
(6) Mekonnen, M. M.; Hoekstra, A. Y. Four Billion People Facing Severe Water Scarcity. Sci. Adv. 2016, 2 (2), e1500323-e1500323.
(7) Kummu, M.; Guillaume, J. H. A.; De Moel, H.; Eisner, S.; Florke, M.; Porkka, M.; Siebert, S.; Veldkamp, T. I. E.; Ward, P. J. The World's Road to Water Scarcity: Shortage and Stress in the 20th Century and Pathways towards Sustainability. Sci. Rep. 2016, 6 (November), 1-16.
(8) Gido, B.; Friedler, E.; Broday, D. M. Assessment of Atmospheric Moisture Harvesting by Direct Cooling. Atmos. Res. 2016, 182, 156-162.
(9) Bagheri, F. Performance Investigation of Atmospheric Water Harvesting Systems. Water Resour. Ind. 2018, 20 (May), 23-28.
(10) Kim, H.; Yang, S.; Rao, S. R.; Narayanan, S.; Kapustin, E. A.; Furukawa, H.; Umans, A. S.; Yaghi, O. M.; Wang, E. N. Water Harvesting from Air with Metal-Organic Frameworks Powered by Natural Sunlight. Science (80-.). 2017, 356 (6336), 430-434.
(11) Kim, H.; Rao, S. R.; Kapustin, E. A.; Zhao, L.; Yang, S.; Yaghi, O. M.; Wang, E. N. Adsorption-Based Atmospheric Water Harvesting Device for Arid Climates. Nat. Commun. 2018, 9 (1), 1-8.
(12) Fathieh, F.; Kalmutzki, M. J.; Kapustin, E. A.; Waller, P. J.; Yang, J.; Yaghi, O. M. Practical Water Production from Desert Air. Sci. Adv. 2018, 4 (6), eaat3198.
(13) Rieth, A. J.; Yang, S.; Wang, E. N.; Dinca, M. Record Atmospheric Fresh Water Capture and Heat Transfer with a Material Operating at the Water Uptake Reversibility Limit. 2017.
(14) Abtab, S. T.; Alezi, D.; Bhatt, P. M.; Shkurenko, A.; Towsif Abtab, S. M.; Alezi, D.; Bhatt, P. M.; Shkurenko, A.; Belmabkhout, Y.; Aggarwal, H.; et al. Reticular Chemistry in Action: A Hydrolytically Stable MOF Capturing Twice Its Weight in Adsorbed Water. Chem 2018, 4 (1), 94-105.
(15) Chen, Z.; Li, P.; Zhang, X.; Li, P.; Wasson, M. C.; Islamoglu, T.; Stoddart, J. F.; Farha, O. K. Reticular Access to Highly Porous Acs-MOFs with Rigid Trigonal Prismatic Linkers for Water Sorption. J. Am. Chem. Soc. 2019, 141 (7), 2900-2905.
(16) Akiyama, G.; Matsuda, R.; Sato, H.; Hori, A.; Takata, M.; Kitagawa, S. Effect of Functional Groups in MIL-101 on Water Sorption Behavior. Microporous Mesoporous Mater. 2012, 157, 89-93.
(17) Ko, N.; Choi, P. G.; Hong, J.; Yeo, M.; Sung, S.; Cordova, K. E.; Park, H. J.; Yang, J. K.; Kim, J. Tailoring the Water Adsorption Properties of MIL-101 Metal-Organic Frameworks by Partial Functionalization. J. Mater. Chem. A 2015, 3 (5), 2057-2064.
(18) Wright, A. M.; Rieth, A. J.; Yang, S.; Wang, E. N.; Dincă, M. Precise Control of Pore Hydrophilicity Enabled by Post-Synthetic Cation Exchange in Metal-Organic Frameworks. Chem. Sci. 2018, 9 (15), 3856-3859.
(19) Yaghi, O. M.; Kalmutzki, M. J.; Diercks, C. S. Introduction to Reticular Chemistry: Metal-Organic Frameworks and Covalent Organic Frameworks; Wiley-VCH: Weinheim, 2019.
(20) Furukawa, H.; Gándara, F.; Zhang, Y.-B.; Jiang, J.; Queen, W. L.; Hudson, M. R.; Yaghi, O. M. Water Adsorption in Porous Metal-Organic Frameworks and Related Materials. J. Am. Chem. Soc. 2014, 136 (11), 4369-4381.
(21) Kalmutzki, M. J.; Diercks, C. S.; Yaghi, O. M. Metal-Organic Frameworks for Water Harvesting from Air. Adv. Mater. 2018, 1704304, 1704304.
(22) Leung, E.; Müller, U.; Trukhan, N.; Mattenheimer, H.; Cox, G.; Blei, S. Process for Preparing Porous Metal-Organic Frameworks Based on Aluminum Fumarate. US 2012/0082864, 2012.
(23) Solovyeva, M. V.; Gordeeva, L. G.; Krieger, T. A.; Aristov, Y. I. MOF-801 as a Promising Material for Adsorption Cooling: Equilibrium and Dynamics of Water Adsorption. Energy Convers. Manag. 2018, 174 (May), 356-363.
(24) Kärger, J.; Ruthven, D. M. Diffusion in Nanoporous Materials: Fundamental Principles, Insights and Challenges. 2016, 4027-4048.
(25) Karger, J.; Ruthven, D. M. Diffusion In Zeolites and Other Microporous Solids; Wiley: London, 1992.
(26) Ji, J. G.; Wang, R. Z.; Li, L. X. New Composite Adsorbent for Solar-Driven Fresh Water Production from the Atmosphere. 2007, 212, 176-182.
(27) Wang, J. Y.; Liu, J. Y.; Wang, R. Z.; Wang, L. W. Experimental Investigation on Two Solar-Driven Sorption Based Devices to Extract Fresh Water from Atmosphere. Appl. Therm. Eng. 2017, 127, 1608-1616.
(28) Li, R.; Shi, Y.; Shi, L.; Alsaedi, M.; Wang, P. Harvesting Water from Air: Using Anhydrous Salt with Sunlight. Environ. Sci. Technol. 2018, 52 (9), 5398-5406.
(29) Yaghi, O. M.; Yang, J. Porous Aluminum Pyrazoledicarboxylate Frameworks. WO 2019/010102, 2019.

Supplement

Material Synthesis and Preparation

MOF-303 Synthesis: 3,5-pyrazoledicarboxylic acid, monohydrate (7.50 g, 43.1 mmol, Crysdot LLC, 97% purity)

was dissolved in deionized $H_2O$ (725 mL) and LiOH solution (2.57 M, 25 mL, Fisher Scientific, 98% purity). The resulting solution was heated for 30 min in a pre-heated oven at 120° C. Afterwards, $AlCl_3.6H_2)$ (10.4 g, 43.1 mmol, Sigma Aldrich Co, ≥99.8% purity) was added to the solution. Any precipitate was dissolved under sonication and vigorous shaking. Once a clear solution was obtained, the hot reaction mixture was put in a pre-heated oven at 100° C., where it was kept for 15 hours. Then, the precipitate was filtrated out and washed with water. The snow-white solid was subsequently washed with MeOH (anhydrous, Macron Fine Chemicals) for 24 hours in a Soxhlet apparatus and air-dried for 3 days. Further, the product was dried under dynamic vacuum ($<10^{-2}$ mbar) for 24 hours. Full activation of the MOF was conducted under dynamic vacuum ($\sim10^{-3}$ mbar) and at 150° C. for 6 hours, yielding pure, desolvated product (3.6 g).

Aluminum Fumarate Synthesis: Large-scale synthesis of Al-fumarate was conducted according to a previously reported procedure.[1] For the material comparison study, Al-fumarate was synthesized in higher quality (larger crystallite size—comparable to MOF-303, and minimal to no hysteresis between water vapor ad- and desorption according to SEM and water sorption analysis, respectively). For this purpose, fumaric acid (66.7 mg, 0.575 mmol, Sigma Aldrich Co, ≥99% purity) and $AlCl_3.6H_2)$ (139 mg, 0.575 mmol, Sigma Aldrich Co, ≥99.8% purity) were dissolved in KOH solution (0.086 M, 10 mL, Fisher Scientific, ≥85% purity). The resulting clear solution was incubated in a pre-heated 100° C. oven for 12 hours, which resulted in precipitation of a white crystalline powder. The product was washed five times over one day with $H_2O$ (15 mL each time) and another five times over a second day with MeOH (15 mL each time).

SAPO-34 (ACS Material, LLC) and zeolite 13X (Alfa Aeser) were commercially attained.

Prior to sorption measurements and gas pycnometry, the samples were activated under dynamic vacuum ($\sim10^{-3}$ mbar) and at elevated temperatures. The MOF samples were activated at 150° C. for 6 hours, SAPO-34 at 180° C. for 12 hours and zeolite 13X at 225° C. for 12 hours.

Cross-Flow Exchanger Assembly

Figure 9:
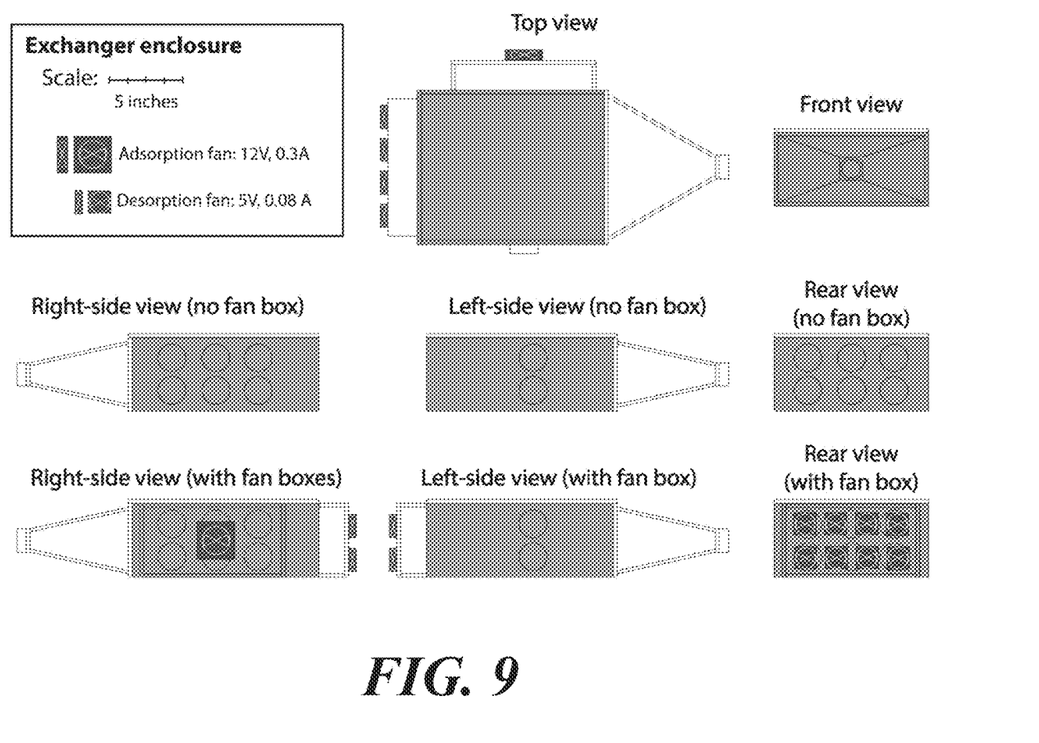
FIG. 9. Illustration of the exchanger enclosure designed to host the sorbent cartridge, with and without the fan boxes used to equip the enclosure with the fans generating convective air flow during operation.

The sorbent-containing exchanger was prepared in several steps. First, a removable cartridge, containing the sorbent powder was built according to the following procedure (FIG. 7): Ten frames (dimensions: 9.75×9.75×0.25 $in^3$), exhibiting four empty square areas each (of dimensions 4.5×4.5×0.25 $in^3$) and made of carbon-fiber-reinforced ONYX, were 3D-printed using a Markforged Mark X7 printer (see FIG. 8 for a blueprint of a frame). Subsequently, the frames were lined on one side with a PTFE laminated membrane (pore size 0.45 µm, Sterlitech Corporation) using Gorilla Super Glue, followed by drying overnight. Microporous PTFE was chosen because of its ability to repel liquid water while allowing for efficient water vapor transport.[4] Then, 433 g of fully desorbed sorbent powder (MOF-303 or Al-fumarate) were distributed evenly inside of the empty spaces of the frames, forming 40 sorbent beds, which were subsequently enclosed with another PTFE membrane glued on the other side of the frame. The glue was again left to dry overnight. The filled trays were finally assembled into a cartridge using acrylic spacers (FIG. 8) and Gorilla Super Glue. The final cartridge exhibited two sets of 0.25 in-wide orthogonal channels, allowing for convection from and towards the sorbent powder (FIG. 8). Once again, the glue was let to dry overnight, using C-clamps to apply pressure and ensure adequate contact between the different parts. The sorbent cartridge was then wrapped with four heating strips (1 in×96 in, 120 V, 830 W, BriskHeat B00101080), and installed inside of a custom-made acrylic enclosure (dimensions: 23.2×12.6×15.25 $in^3$). This enclosure was equipped with one fan (12 V, 0.3 A, Sunon MF40101VX-1000U-A99) for convective mass transfer during the water adsorption phase, using one set of channels, and eight smaller fans (5VDC, 3.3 CFM, Qualtek FAD1-04010BSAW11) for forced convection of the generated vapor during the desorption phase, using the other set of channels (FIG. 9).

Water Harvester: Preparation and Data Acquisition

The exchanger outlet was connected to a commercial 12 V AC unit acting as a condenser (Model DV1910E-1C 12V Pro from Rigid HVAC Co., LTD) using reinforced plastic tubing with an internal diameter of 1.575 in. The condenser was composed of a mini-compressor (QX1901VDH) cycling a cooling fluid through an insulated cold chamber and a warm radiator. The water harvester was powered with four 12 V deep-cycle batteries (140 Ah, PHCC Pro Series).

Readings of temperature and RH were collected through a National Instruments data acquisition system (cDAQ-9174) interfaced with a NI 9205 32-Channel analog input and a NI 9214 16-Channel Isothermal TC Module. The corresponding data was recorded using the software Labview 2016 (National Instruments). Temperature sensors were placed at different locations inside and outside (for ambient condition measurements) of the harvester.

The RH was measured using fast-response sensors (Honeywell HIH-4021) containing thermoset capacitive sensing elements. These sensors were calibrated in the 5-90% RH range, at 25° C. and with 5% RH increments, inside a humidity generator (HygroCa1100, Michell Inc.). A calibration curve (fitted with a second order polynomial law) was created using the output voltage of the sensors and the RH set by the humidity generator. The temperature was measured using T-type thermocouples (Neoflon PFA, American Wire Gauge 40, OMEGA Engineering). These sensors were calibrated between 15 and 120° C. in increments of 5° C. inside of a dry-well calibrator (Hart Scientific 9103). Around forty data points were collected and averaged at each temperature, with a sampling rate of 5 s, and the calibration data was fitted with a linear function.

Water Harvester: Operation

During the desorption step, the heating strips were powered in parallel with 36 V, and drew 5.8 A of current until the temperature at the center of the exchanger was ~120° C. The heating strips were then switched to a 24 V power supply (now using only two batteries and drawing 3.9 A) to keep the temperature constant inside of the exchanger (FIB. 4B). In addition, the eight fans located at the rear of the exchanger were wired in two series-connected groups of four fans, themselves powered in parallel by one 12 V battery (drawing 0.11 A) and switched to 24 V on two batteries as soon as condensation started to appear on the walls of the exchanger (after ~10 minutes, now drawing 0.13 A). The condenser was powered by a different 12 V deep-cycle battery and was drawing about 10 A. The desorption was stopped once the RH in the exchanger outlet reached a constant minimum. The liquid water was collected at the bottom of the condenser through an outlet equipped with a piece of Tygon tubing connected to a glass bottle (FIG. 5B-C).

During the adsorption step, only the fan located on the side of the exchanger was powered with a 12 V deep-cycle battery (drawing 0.08 A). The optimal length of the adsorption step was determined using the kinetics measurement reported in FIGS. 4C-4D.

Water Harvesting under Arid Conditions Indoors: Optimization of the Adsorption Time An empirical study showed that desorption times typically ranged from 20 min for low loading (this corresponds to the minimum time for water vapor to be released and transferred to the condenser, due to inertia) to 70 min at higher loading (85% of the maximum capacity).

To determine the optimal adsorption time at a given RH, we define the cycle rate as a function of adsorption time $t_{ads}$ and desorption time $t_{des}$:

Cycle rate $(t_{ads}, t_{des})$=mass of adsorbed water $(t_{ads})/(t_{ads}+t_{des})$ (S3)

The mass of adsorbed water as a function of $t_{ads}$ is plotted in FIG. 4D. For a given RH, and a given value of $t_{ads}$ the cycle rate depends on $t_{des}$ only, and Cycle rate $(t_{ads}, t_{ads}20\ min) \leq$ Cycle rate $(t_{ads}, t_{des}) \leq$ Cycle rate $(t_{ads}, t_{des}=70\ min)$ This defines a range of cycle rates for each value of $t_{ads}$. The optimum adsorption time is then chosen as the time needed to reach the average maximum at each RH. As a result, the adsorption time is set to 50 minutes for an RH of 40%, to 110 minutes for an RH of 30%, and to 130 minutes for an RH of 20%.

Water Harvesting in the Mojave Desert

Solar flux and output power was measured for the solar module as a function of the time of day at the location of the three-day experiment conducted in the Mojave Desert.

By integration of the data, we estimate that each day the solar module delivers:

$E_{module,1day}$=2050 Wh

If we assume the solar module delivers the same amount of energy per day on average, the total energy delivered over the course of the desert experiment was:

$E_{module,total}$=6150 Wh

On the other hand, the average length of a WHC was 2.88 hours (25 cycles over 72 hours). Based on the calculations presented in Section S5.2, we estimate the average power consumption of a WHC to be:

$P_{WHC,avg}$=90 W

And the associated energy consumption to be:

$E_{WHC,avg}$=90 W·2.88 h=259 Wh

The total energy consumed over the course of the experiment was:

$E_{harvester,total}$=25·259 Wh=6480 Wh

Therefore, we estimate that the solar module was only able to provide 95% of the total energy consumed over three days. However, the initial charge of the batteries was enough to provide the remaining 5%. A larger module or a more energy-efficient WHC should be used for the harvester to operate continuously and off-grid for a more extended time under the same conditions.

Supplemental References (1) Kayal, S.; Chakraborty, A.; Teo, H. W. B. Green Synthesis and Characterization of Aluminium Fumarate Metal-Organic Framework for Heat Transformation Applications. *Mater. Lett.* 2018, 221, 165-167.

(2) Kim, H.; Cho, H. J.; Narayanan, S.; Yang, S.; Furukawa, H.; Schiffres, S.; Li, X.; Zhang, Y.-B.; Jiang, J.; Yaghi, O. M.; et al. Characterization of Adsorption Enthalpy of Novel Water-Stable Zeolites and Metal-Organic Frameworks. *Sci. Rep.* 2016, 6 (1), 19097.

(3) Buck, A. L. New Equations for Computing Vapor Pressure and Enhancement Factor. *J. Appl. Meteorol.* 1981, 20 (12), 1527-1532.

(4) Gibson, P. W. Effect of Temperature on Water Vapor Transport through Polymer Membrane Laminates. *Polym. Test.* 2000, 19 (6), 673-691.

The invention claimed is:

1. An atmospheric water harvesting system, wherein the system cycles between an adsorption mode followed by a desorption mode, the system comprising:
   a plurality of trays, stacked one on top of each other,
      wherein each tray has a permeable membrane that holds water capture material;
      wherein the plurality of trays form a box with four sides,
         wherein one side is an adsorption entry side, one side is an adsorption exit side, one side is a desorption entry side, and one side is a desorption exit side, and
         wherein the adsorption entry side and the adsorption exit side opposite to each other, and the desorption entry side and the desorption exit side are opposite to each other;
   a plurality of spacers positioned between every other tray on the adsorption entry side to create a set of adsorption channels;
   a plurality of spacers positioned between every other tray on the desorption entry side to create a set of desorption channels,
      wherein the set of adsorption channels are separated from and orthogonal to the set of desorption channels;
   at least one heating element positioned externally to the plurality of trays;
   at least one adsorption fans are positioned near the adsorption entry side,
   at least one desorption fans are positioned near the desorption entry side,
   a condenser positioned near the desorption exit side,
   wherein, in the adsorption mode,
      the at least one adsorption fans are configured to direct surrounding air through the adsorption channels, and
      at least a portion of the water capture material on each tray adsorbs moisture from the surrounding air;
   wherein, in the desorption mode,
      the at least one heating element is configured to provide heated air, and
      the at least one desorption fans are configured to direct heated air through the desorption channels that causes release of water vapor from at least a portion of the water capture material, and to direct released water vapor towards the condenser; and wherein the condenser is configured to condense the water vapor released through the desorption channels and to produce liquid water.

2. The system of claim 1, wherein the at least one heating element comprises at least one solar heater, and wherein the at least one solar heater is configured to heat air surrounding the plurality of trays in the desorption mode to indirectly provide heat that causes release of water vapor from at least a portion of the water capture material therein.

3. The system of claim 1, wherein, in the adsorption mode, the at least one adsorption fans are configured to further direct air out of the plurality of trays, and wherein the air released from the plurality of trays is heated by the at least one heating element to provide the heated air used in the desorption mode.

4. The system of claim 3, further comprising:
a second plurality of trays, stacked one on top of each other,
  wherein each tray has a permeable membrane that holds additional water capture material;
  wherein the second plurality of trays form a box with four sides,
    wherein one side is an adsorption entry side, one side is an adsorption exit side, one side is a desorption entry side, and one side is a desorption exit side, and
    wherein the adsorption entry side and the adsorption exit side opposite to each other, and the desorption entry side and the desorption exit side are opposite to each other;
a second plurality of spacers positioned between every other tray on the adsorption entry side to create a second set of adsorption channels in the second plurality of trays;
a second plurality of spacers positioned between every other tray on the desorption entry side to create a second set of desorption channels in the second plurality of trays,
  wherein the second set of adsorption channels are separated from and orthogonal to the second set of desorption channels;
at least one second adsorption fans are positioned near the adsorption entry side,
at least one second desorption fans are positioned near the desorption entry side,
wherein, in the adsorption mode,
  the at least one second adsorption fans are configured to direct surrounding air through the second set of adsorption channels, and
  at least a portion of the water capture material on each tray adsorbs moisture from the surrounding air;
wherein, in the desorption mode,
  the at least one desorption fans are configured to direct the heated air through the second set of desorption channels that causes release of water vapor from at least a portion of the additional water capture material, and to direct released water vapor towards the condenser; and
wherein the condenser is configured to condense the water vapor released through the second set of desorption channels and to produce additional liquid water.

5. An atmospheric water harvesting system, wherein the system cycles between an adsorption mode followed by a desorption mode, the system comprising:
a plurality of trays, stacked one on top of each other,
  wherein each tray comprises a permeable membrane that holds water capture material, and
  wherein the plurality of trays form a box with four sides,
    wherein one side is an adsorption entry side, one side is an adsorption exit side, one side is a desorption entry side, and one side is a desorption exit side, and
    wherein the adsorption entry side and the adsorption exit side opposite to each other, and the desorption entry side and the desorption exit side are opposite to each other;
at least one heating element positioned within the plurality of trays;
a plurality of spacers positioned between every other tray on the adsorption entry side to create a set of adsorption channels;
a plurality of spacers positioned between every other tray on the desorption entry side to create a set of desorption channels,
  wherein the set of adsorption channels are separated from and orthogonal to the set of desorption channels;
at least one adsorption fans are positioned near the adsorption entry side;
at least one desorption fans are positioned near the desorption entry side;
a condenser positioned near the desorption exit side,
wherein, in the adsorption mode,
  the at least one adsorption fans are configured to direct surrounding air through the adsorption channels, and
  at least a portion of the water capture material on each tray adsorbs moisture from the surrounding air;
wherein, in the desorption mode,
  the at least one heating element is configured to provide heat that causes release of water vapor from at least a portion of the water capture material, and
  the at least one desorption fans direct released water vapor towards the condenser; and
wherein the condenser is configured to condense the water vapor released through the desorption channels and to produce liquid water.

6. The system of claim 5, wherein the at least one heating element is incorporated into the plurality of trays, and in contact with at least a portion of the water capture material.

7. The system of claim 5, wherein the at least one heating element is at least one resistive heater configured to directly heat the water capture material that causes release of water vapor from at least a portion of the water capture material in the plurality of trays in the desorption mode.

8. The system of claim 1, further comprising a power source, wherein the power source comprises at least one solar panel, or an electrical power source, or a combination thereof.

9. The system of claim 1, further comprising a water storage tank.

10. The system of claim 1, further comprising:
at least one sensor, configured to detect the saturation level of the water capture material in the plurality of trays; and
at least one controller, configured to receive input from the at least one sensor regarding the saturation level of the water capture material in the plurality of trays, and to turn on the heating element when a predetermined saturation level is reached.

11. The system of claim 1, wherein the water capture material comprises metal-organic framework.

12. The system of claim 1, wherein the water capture material comprises MOF-801, MOF-841, aluminum fumarate, CAU-10, or MOF-303, or any combination thereof.

13. A method of harvesting water from surrounding air using an atmospheric water harvesting system of claim 1, the method comprising:

directing surrounding air through the adsorption channels in the adsorption mode, wherein at least a portion of the water capture material adsorbs moisture from the surrounding air;

heating air using the at least one heating element to produce heated air;

directing the heated air through the desorption channels to release water vapor from at least a portion of the water capture material in the desorption mode; and     condensing the released water vapor using the condenser to produce liquid water.

14. A method of harvesting water from surrounding air using an atmospheric water harvesting system of claim 5, the method comprising:

directing surrounding air through the adsorption channels in the adsorption mode, wherein at least a portion of the water capture material adsorbs moisture from the surrounding air;

heating air using the at least one heating element to produce heated air;

directing the heated air through the desorption channels to release water vapor from at least a portion of the water capture material in the desorption mode; and     condensing the released water vapor using the condenser to produce liquid water.

15. A method of harvesting water from surrounding air using an atmospheric water harvesting system, wherein the system comprises: a plurality of trays stacked one on top of each other, wherein each tray comprises a permeable membrane that holds water capture material, and wherein the plurality of trays are arranged to form a set of adsorption channels and a set of desorption channels, wherein the set of adsorption channels are separated from and orthogonal to the set of desorption channels; at least one heating element positioned externally to the plurality of trays; and a condenser; and wherein the system cycles between an adsorption mode followed by a desorption mode, the method comprising:

directing surrounding air through the adsorption channels in the adsorption mode, wherein at least a portion of the water capture material adsorbs moisture from the surrounding air;

heating air using the at least one heating element to produce heated air;

directing the heated air through the desorption channels to release water vapor from at least a portion of the water capture material in the desorption mode; and     condensing the released water vapor using the condenser to produce liquid water; or a method of harvesting water from surrounding air using an atmospheric water harvesting system, wherein the system comprises: a plurality of trays stacked one on top of each other, wherein each tray comprises a permeable membrane that holds water capture material, and wherein the plurality of trays are arranged to form a set of adsorption channels and a set of desorption channels, wherein the set of adsorption channels are separated from and orthogonal to the set of desorption channels; at least one heating element positioned within the plurality of trays; and a condenser; and wherein the system cycles between an adsorption mode followed by a desorption mode, the method comprising:

directing surrounding air through the adsorption channels in the adsorption mode, wherein at least a portion of the water capture material adsorbs moisture from the surrounding air;

heating the water capture material using the at least one heating element in the desorption phase to release water vapor from at least a portion of the water capture material;

directing the released water vapor through the desorption channels towards the condenser; and     condensing the released water vapor using the condenser to produce liquid water.

16. The method of claim 15, wherein the at least one heating element comprises at least one solar heater.

17. The method of claim 15, wherein the at least one heating element comprises at least one resistive heater.

18. The method of claim 15 further comprising collecting the liquid water, and storing the liquid water.

19. The method of claim 15, wherein the water capture material comprises metal-organic framework.

20. The method of claim 15, wherein the water capture material comprises MOF-801, MOF-841, aluminum fumarate, CAU-10, or MOF-303, or any combination thereof.

* * * * *